US 7,035,276 B2

(12) United States Patent
Bradford et al.

(10) Patent No.: US 7,035,276 B2
(45) Date of Patent: Apr. 25, 2006

(54) CONTENTION-RESOLUTION SYSTEM FOR A COMMAND- RESPONSE DATA NETWORK

(75) Inventors: G. Patton Bradford, Huntsville, AL (US); Michael C. Pitruzzello, Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 967 days.

(21) Appl. No.: 10/127,139

(22) Filed: Apr. 17, 2002

(65) Prior Publication Data

US 2003/0198245 A1    Oct. 23, 2003

(51) Int. Cl.
*H04L 12/413* (2006.01)

(52) U.S. Cl. .................... 370/445; 370/448
(58) Field of Classification Search ........... 370/445, 370/431, 448, 447, 461, 463, 334, 328, 324, 370/350, 418, 395.62, 426, 496, 503, 507, 370/522, 525, 526, 518, 519, 277, 310, 489, 370/421, 423, 270, 326, 336, 376, 395.1, 370/398, 422, 458, 294, 321, 337, 347, 77, 370/85.2, 85.3, 498, 100.1, 103, 105, 110.2, 370/110.3, 414, 416; 375/130, 219, 220; 709/217, 218, 219, 230, 235
See application file for complete search history.

(56) References Cited

U.S. PATENT DOCUMENTS

| 6,788,702 | B1 * | 9/2004 | Garcia-Luna-Aceves et al. | 370/458 |
| 6,928,061 | B1 * | 8/2005 | Garcia-Luna-Aceves et al. | 370/329 |
| 2002/0080768 | A1 * | 6/2002 | Garcia-Luna-Aceves et al. | 370/349 |
| 2002/0163933 | A1 * | 11/2002 | Benveniste | 370/465 |
| 2003/0033394 | A1 * | 2/2003 | Stine | 709/222 |

OTHER PUBLICATIONS

"Chapter 4. Hardware interconnection technology" in *Distributed Systems: Architecture and Implementation*, Lampson, B.W., et al, editors; Springer-Verlag (New York, 1981), p. 76.

* cited by examiner

*Primary Examiner*—Wellington Chin
*Assistant Examiner*—Jamal A. Fox
(74) *Attorney, Agent, or Firm*—Hay Kyung Chang

(57) ABSTRACT

Applicants' Contention-Resolution System for a Command-Response Data Network uses a base unit (base) that detects the occurrence of collisions for the entire network and controls the maximum length of time allowed for the multiple remote units (remotes) in the network before re-trying to send responses to the base. The base either expands or contracts this maximum time delay as needed to accommodate the number of the possible network remotes, depending on the detected collision rate and the overall utilization of the network until the base determines that there are no remotes to be registered or all of the available network slots are filled, whichever occurs first.

14 Claims, 3 Drawing Sheets

Base Registration Process

Remote Registration Process

CONTENTION-RESOLUTION SYSTEM FOR A COMMAND- RESPONSE DATA NETWORK

DEDICATORY CLAUSE

The invention described herein may be manufactured, used and licensed by or for the Government for governmental purposes without the payment to us of any royalties thereon.

BACKGROUND OF THE INVENTION

In any time-division multiplex data communication network where the exact number of the participants is unknown, there must be found some contention-resolution means to deal with the possible situations of messages being sent from multiple participants at the same time, and, as a result, arriving garbled.

Currently, there are various ways to accomplish contention-resolution, each suffering from one type of deficiency or another. For example, in the classic ALOHA network, a participant transmits its message and listens at the same time (or with some pre-defined delay). If it hears its own message garbled, then it waits a random length of time before retrying. Slotted ALOHA improves on the performance of the basic ALOHA network by requiring that network participants transmit on pre-defined time boundaries. This approach requires that one of the participants provide a timing marker for the rest.

Carrier Sense Multiple Access (CSMA) networks are an improvement over ALOHA networks in that participants listen for another transmission before attempting to transmit themselves. In Carrier Sense Multiple Access-Collision Detect (CSMA-CD), one version of which is IEEE 802.3, the sender senses to determine whether the voltage level on the medium is greater than that generated by the sender itself. If so, then the sender will follow a binary exponential back-off scheme until it can send its message in the clear.

Multiple Access with Collision Avoidance (MACA) techniques use the broadcast of Ready-to-Send (RTS) and Clear-to-Send (CTS) messages to minimize the probability of collisions. However, when the collisions do occur, a binary exponential back-off is used to determine when a retry should occur.

All of the above-mentioned contention-resolution ways have two factors in common. First, each participant (remote) in the network is responsible for determining if a collision has occurred. Second, the participants retry at random times after the collision, either over a fixed period of time or over a period of time that continually expands, possibly exponentially. Potential problems associated with these are: one, each participant in the network must be capable of detecting collisions, even while the participant is transmitting its own message. In radio-frequency based networks, this may be extremely difficult, if not impossible; two, if the network is lightly loaded and the time within which participants may retry is fixed, there may be significant length of time wasted. If on the other hand, the network is heavily loaded, collisions may be excessive and no messages get through. If the retry time is allowed to expand, then the delay time may, again, become excessive. These problems may be particularly acute when registering the participating units into the network at the start of the network operation, when the number and the location of the participating units are unknown.

SUMMARY OF THE INVENTION

Applicants' Contention-Resolution System for a Command-Response Data Network solves the problems attendant with the current means of contention-resolution by using a base unit (base) that detects the occurrence of collisions for the entire network and controls the length of time allowed for the multiple remote units (remotes) in the network to delay before retrying. The base either expands or contracts this time delay as needed to accommodate the number of the possible network participants, depending on the detected collision rate and the overall utilization of the network until the base determines that there are no remotes to be registered or all of the available network slots are filled.

DESCRIPTION OF THE PREFERRED EMBODIMENT

Figure 1:
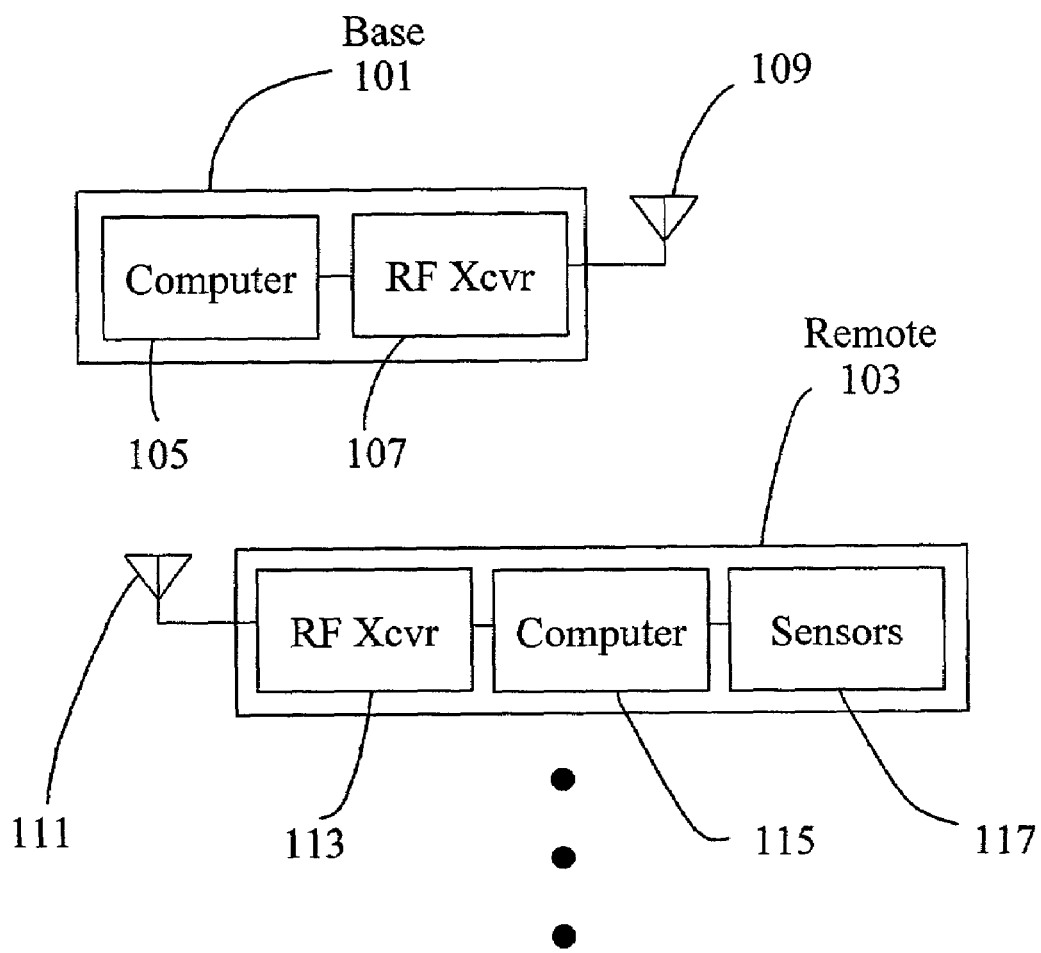
FIG. 1 is a diagram of the entire network comprised of a base and a plurality of participating remotes, the number of which is unknown to the base prior to completion of the registration process.
Figure 2:
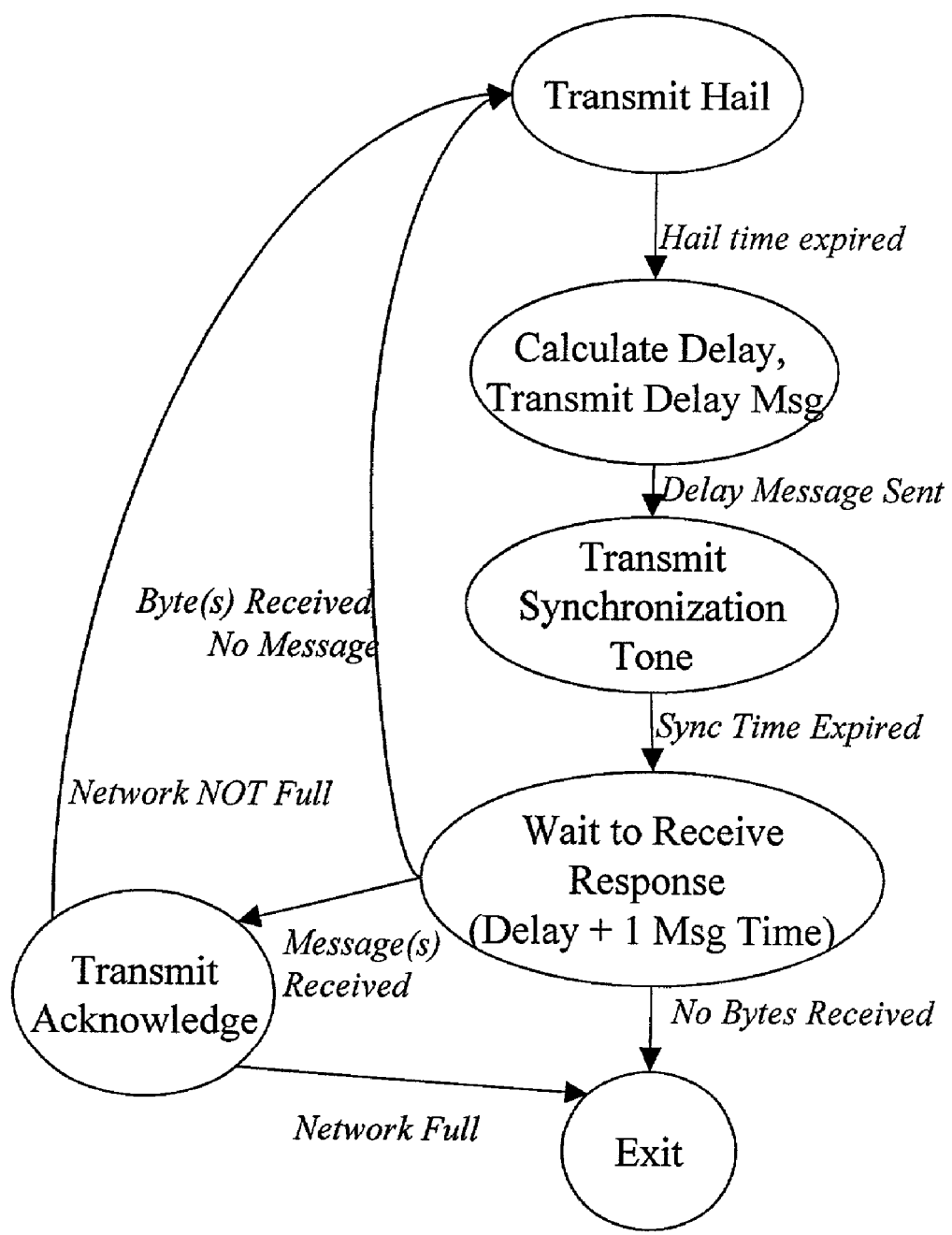
FIG. 2 is a flow-chart illustrating the steps of the registration process from the point of view of the base.
Figure 3:
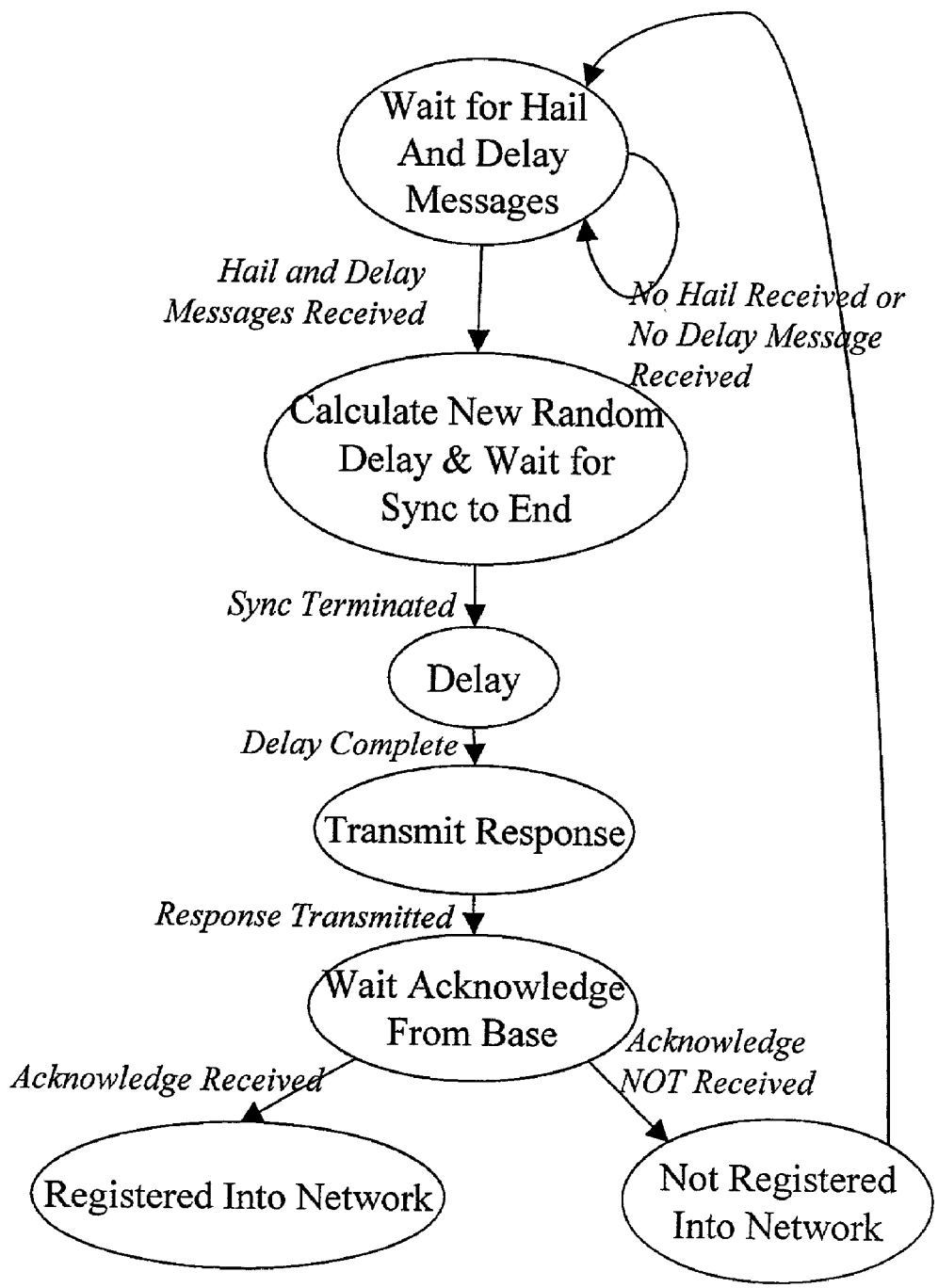
FIG. 3 is a flow-chart illustrating the steps of the registration process from the point of view of a representative remote.

Referring now to the drawing wherein like numbers represent like parts in each of the several figures and arrows indicate the direction of signal travel, network registration process is described in detail. For illustrative purposes only, the process is described from the point of view of the base first, and then from the point of view of a representative remote.

To begin the network registration process, first computer 105 comprising base unit 101 causes first radio frequency (RF) transceiver 107 to broadcast via first antenna 109 a tone or a message, hereafter referred to as the "hail". The remote units are pre-programmed to recognize this hail as the beginning of the registration process. Upon completion of this broadcast, the base calculates and broadcasts, in a similar manner, a message containing a maximum time delay that should be used by the remotes in responding to the hail. If either no hail is received by a remote, or a hail is received but is not followed by a delay signal, the remote considers itself not registered into the network and continues to wait for the next hail. However, if a hail signal and a maximum time delay signal are received by second RF transceiver 113 via second antenna 111, second computer 115 residing in representative remote 103 calculates a new random delay period between 0 and the maximum stated by the base. Meanwhile, base 101 follows up the maximum time delay message with a synchronization tone, which is used to synchronize the timing between the base unit and the various remote units. The termination of the synchronization tone indicates that the remote units are to start the random time delays before sending their responses.

The means for calculating the maximum time delay must accomplish two objectives, namely: the maximum time delay must be as short as possible, while still assuring that all remotes that can respond have sufficient time to respond to the hail, and it must provide a way of resolving the contention between messages whose times of transmission overlap.

In a situation where all of the remotes begin their responses at random times between 0 and N, N indicating the maximum, the minimum time that the base must wait for responses and be assured that all of the available remotes have responded is N plus the time it takes for one remote to complete sending a response message. The length of N requires some consideration. If it is too short, then most, if not all responses from the remotes will collide. If it is too long, then much time will be wasted, with no guarantee that there will be no collisions.

For message contention-resolution, several possibilities exist, all with some undesirable aspects. One is to have the remotes that are generating the colliding messages to generate new random time delays and try again, with the hopeful expectation that the new delays would avoid collisions. One problem with this is that, in a congested environment, if the bandwidth range in which a delay may be selected is not sufficiently wide, the contention may not be resolved. Another possibility is utilizing the binary exponential back-off used in CSMA-CD networks. In this case, each networked remote has a back-off schedule built into it. When the remote detects a collision, the unit doubles its back-off on each subsequent transmission attempt. In a highly congested environment, this back-off scheme could rapidly become excessive with the resulting waste of long lengths of time.

Unlike the scheme in which each individual remote assesses the collisions involving its own messages, in applicants' system, base 101 makes an assessment of the number of collisions for the entire network and the level of bandwidth utilization, then adjusts the maximum back-off accordingly and informs the remote units of the new delay. This minimizes the registration logic required on the remotes. There are two approaches to adjusting the maximum back-off time delay. One approach uses a static back-off schedule and the other uses a dynamic back-off schedule. The preferred approach is the one using a dynamic back-off schedule. However both approaches are explained hereinbelow.

If the static back-off schedule is used, then base 101 and each remote 103 have a priori knowledge of a common back-off schedule. This back-off schedule consists of a series of fixed increasing time delays that may be used by the remotes for the generation of random time delays for responses. Specifically, each entry in the schedule is the maximum value of a range of time delay within which a remote may generate a random time delay and the duration of time the base must wait (less the actual message time), the minimum being zero. Thus, using the static back-off schedule, each time a hail is received, each remote generates a random time delay between zero and the present value in the common back-off schedule. The receipt of each succeeding hail results in a new random back-off being generated using the succeeding fixed value in the back-off schedule, and on each successive hail, the base changes its wait time by a corresponding time duration. Regeneration of a random time delay on each succeeding hail should result in a quicker resolution relative to the binary exponential back-off, while the expanding range specified in the common back-off schedule helps mitigate the effect of a congested environment. This common back-off schedule may be tailored to meet the needs of the expected network environment. For example, the back-off schedule could be: N, N+N, $$N+N+\frac{1}{2}N, N+N+\frac{1}{2}N+\frac{1}{4}N,$$

where N is the initial range for the random time delay generation by each remote.

In the approach using the dynamic back-off schedule on a per cycle basis, the base sends out a maximum time delay against which the remote generates a random time delay that is less than or equal to the maximum value. After this random time delay has expired, the remote transmits its response containing the unique address of the remote to the base (the unique address of a remote allows the remote to respond only when commands are specifically directed to it in future communications with the base, such as reporting environmental conditions around the remote as sensed by sensor 117). On receipt of these responses, the base can make a determination of the level of congestion of the network. On the next hail, the base can send out a new maximum delay. The dynamic back-off approach has the advantage that the maximum time delay range can expand rapidly under heavy load conditions or remain constant or even contract under lighter-than-expected load conditions. It is noted that in order to use the dynamic back-off approach, the base must be able to determine load conditions of the network. For example, the base can calculate the total number of bytes received versus the number of bytes contained in valid response packets. This would give a measure of the collision rate. The base can also calculate the number of bytes received versus the total number of bytes that could have been received during the wait time. This would indicate the overall network utilization. However, it is recognized that other means of determining congestion and utilization do exist.

Upon the termination of the synchronization tone, the base begins to listen for responses from the remotes while a remote waits for its random time delay to expire before transmitting its response containing its unique address and then awaiting an acknowledgment signal from the base. The base listens for a period of time that is equal to at least the specified maximum time delay plus the time it takes to receive one complete response message. During this time, the base may keep track of such statistics as the number of valid response messages received and the total number of bytes received. If no bytes are received by the base, then the base may assume that there are no remotes available to register and exit the registration process. If, however, one or more valid messages are received, the base registers the responding remotes into the network and transmits an acknowledgment to the remotes. In such a case, and also in the case where bytes are received but not a complete response (example, due to collisions), the base goes back and transmits a new hail and a new maximum time delay to start the registration process all over. This cycle repeats until either no bytes are received or the available network slots are all filled.

If a remote receives the acknowledgment signal, then the remote considers itself registered into the network and does not respond to any other hail message until released by the base. If an acknowledgment is not received, then the remote assumes that it is not registered and goes back and waits for the next hail.

The superiority of applicants' Contention-Resolution System for a Command-Response Data Network arises from several factors. First, only one unit in the network, namely the base, needs to be capable of determining when collisions have occurred. Second, having a known time period in which remotes can respond to a hail sets an upper limit on the time that the base must wait for possible responses. Third, the ability to expand and contract this wait time on a per cycle basis allows the entire registration process to adapt rapidly to load conditions. Fourth, this ability to accommodate large and small load conditions allows network set-up to be accomplished in near-optimal time.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. A method for resolving contention among the signals traveling between a base and a plurality of remotes and among the signals from the plural remotes, in the process to register the remotes into a data network having a predetermined number of network slots, said method utilizing radio frequency signals and comprising the steps of:
    Broadcasting a hail signal from the base to initiate the registration process, said hail signal being intended for the remotes;
    Allowing a pre-selected hail time to expire;
    Calculating at the base maximum time delay signal, said time delay signal to be used by the remotes in responding to the base;
    Transmitting said maximum time delay signal to the remotes;
    Issuing a synchronization signal to the remotes;
    Accepting at one or more remotes said maximum time delay signal and calculating therefrom a new random delay, said random delay having a time value ranging between "0" and said maximum;
    Waiting for said synchronization signal to complete and said random delay to expire;
    Sending to the base a response from one or more remotes, said response containing therein the unique address of its respective remote;
    Receiving at the base said responses from one or more remotes and registering said remotes into the data network;
    Conveying acknowledgment signals to the remotes, said acknowledgment signals indicating the registration of said remotes into the data network; and
    Exiting the registration process.

2. A method for resolving contention among the signals traveling between a base and a plurality of remotes and among the signals from the plural remotes, in the process to register the remotes into a data network as set forth in claim 1, wherein said Receiving step at the base includes:
    Returning to said Broadcasting step if no complete response has been received from at least one remote; and
    Continuing the registration process therefrom until either no bytes are received or all of said network slots are filled.

3. A method for resolving contention as set forth in claim 2, wherein said Conveying step includes;
    Determining at the remotes whether registration has occurred;
    Awaiting a subsequent hail signal from the base if no registration has been detected; and
    Proceeding with the registration process until an acknowledgment signal is received from the base indicating successful registration.

4. A method for resolving contention as set forth in claim 3, wherein said Calculating step utilizes a dynamic back-off approach, on a per-cycle basis, factoring into the calculation the network loading conditions and bandwidth utilization.

5. A method for resolving contention as set forth in claim 3, wherein said Calculating step utilizes a fixed back-off schedule, said schedule being pre-programmed into the base and the remotes.

6. A system for detecting collisions and resolving contention between command and response signals in a registration process into a data network, said system comprising: a base unit, said base unit being capable of initiating the registration process by issuing hail signals, followed by maximum delay signals; a plurality of remote units to be registered into said data network, said remote units each having a unique address and responding to said hail signals by transmitting response signals containing their respective addresses to said base unit, said base unit registering said remote units upon receipt of complete responses therefrom.

7. A system for detecting collisions and resolving contention between command and response signals in a registration process into a data network as set forth in claim 6, wherein said system further comprises: a first antenna coupled to said base unit for broadcasting said hail and maximum delay signals and for receiving any incoming signals; and a plurality of second antennas, each of said second antennas being coupled to one of said remote units for receiving signals emanating from said base unit and transmitting said response signals from said remote unit.

8. A system for detecting collisions and resolving contention between command and response signals in a registration process into a data network as set forth in claim 7, wherein said base unit comprises: a first computer for generating said hail and maximum delay signals; and a first radio frequency (RF) transceiver coupled to said first computer, said first transceiver broadcasting said hail and maximum delay signals.

9. A system for detecting collisions and resolving contention between command and response signals as set forth in claim 8, wherein each of said plural remote units comprises: a second RF transceiver; and a second computer, said second computer being coupled to said second transceiver and generating said response signals containing said address and transmitting said response signals to said second transceiver to be broadcast therefrom.

10. A system for detecting collisions and resolving contention between command and response signals as set forth in claim 9, wherein said base unit produces synchronization signals to synchronize the broadcast of said response signals from said remote units, said synchronization signals cooperating with said maximum delay signals to minimize collisions between said base unit-generated signals and said remote unit-generated signals as well as between said remote unit-generated signals from said plurality of remote units.

11. A system for detecting collisions and resolving contention between command and response signals as set forth in claim 10, wherein said second computer has residing therein information regarding pre-selected back-off schedule.

12. A system for detecting collisions and resolving contention between command and response signals as set forth in claim 11, wherein said data network has a predetermined number of slots and wherein said base unit terminates said registration process when no remote unit-generated signals are received or when all of said slots are filled with remote unit addresses.

13. A system for detecting collisions and resolving contention between command and response signals as set forth in claim 12, wherein said base unit generates said maximum delay signals based on a dynamic back-off approach.

14. A system for detecting collisions and resolving contention between command and response signals as set forth in claim 12, wherein said base unit generates said maximum delay signals based on a common back-off schedule, said schedule being programmed into said base unit and said plurality of remote units prior to commencement of said registration process.

* * * * *